United States Patent
Chi et al.

(10) Patent No.: US 10,233,283 B2
(45) Date of Patent: *Mar. 19, 2019

(54) POLYCARBONATE RESIN FOR FILM, METHOD FOR PREPARING THE SAME AND FILM INCLUDING THE SAME

(71) Applicant: Lotte Advanced Materials Co., Ltd., Yeosu-si (KR)

(72) Inventors: Jun Ho Chi, Uiwang-si (KR); O Sung Kwon, Uiwang-si (KR); Jong Chan Hur, Uiwang-si (KR); Hyuck Man Kwon, Uiwang-si (KR); Dong Geun Lee, Uiwang-si (KR); Woo Suk Chei, Uiwang-si (KR); Bok Nam Jang, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 1373 days.

This patent is subject to a terminal disclaimer.

(21) Appl. No.: 14/026,361

(22) Filed: Sep. 13, 2013

(65) Prior Publication Data

US 2014/0186602 A1   Jul. 3, 2014

(30) Foreign Application Priority Data

Dec. 27, 2012   (KR) .................. 10-2012-0155602

(51) Int. Cl.
*C08G 64/16*   (2006.01)
*C08G 64/06*   (2006.01)
(Continued)

(52) U.S. Cl.
CPC .......... *C08G 64/06* (2013.01); *B29C 47/0021* (2013.01); *B29C 47/92* (2013.01);
(Continued)

(58) Field of Classification Search
CPC .. C08G 64/06; C08G 64/307; B29C 47/0021; B29C 47/92; B29C 2947/92704;
(Continued)

(56) References Cited

U.S. PATENT DOCUMENTS

| 4,746,721 A | 5/1988 | Ueno et al. |
| 5,401,826 A | 3/1995 | Sakashita et al. |

(Continued)

FOREIGN PATENT DOCUMENTS

| CN | 1397582 A | 2/2003 |
| CN | 102105535 A | 6/2011 |

(Continued)

OTHER PUBLICATIONS

Office Action in counterpart Chinese Application No. 201310546206X dated Apr. 20, 2015, pp. 1-2.

(Continued)

*Primary Examiner* — Nancy R Johnson
(74) *Attorney, Agent, or Firm* — Additon, Higgins & Pendleton, P.A.

(57) ABSTRACT

A polycarbonate resin includes a repeat unit represented by Formula 1; a repeat unit represented by Formula 2; and a repeat unit represented by Formula 3, wherein the polycarbonate resin has a weight average molecular weight of about 15,000 g/mol to about 60,000 g/mol and a melt index of about 3 g/10 min to about 40 g/10 min.:

<Formula 1>

(Continued)

-continued

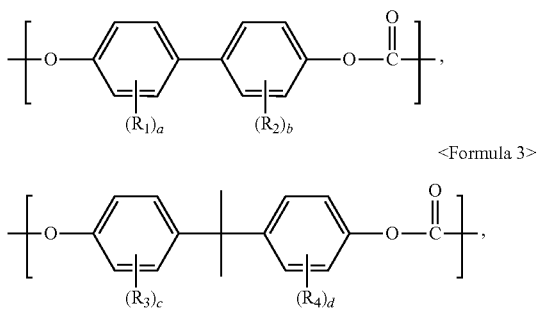

<Formula 2>

<Formula 3> wherein $R_1$, $R_2$, $R_3$, $R_4$, a, b, c, and d are the same as defined in the specification. The polycarbonate resin for film can exhibit excellent scratch resistance, elongation, chemical resistance and heat resistance, and can be used to prepare a film in roll form without any protective film.

14 Claims, 1 Drawing Sheet

(51) Int. Cl.
 C08G 64/30 (2006.01)
 B29C 47/92 (2006.01)
 B29C 47/00 (2006.01)
(52) U.S. Cl.
 CPC .. *C08G 64/307* (2013.01); *B29C 2947/92152* (2013.01); *B29C 2947/92209* (2013.01); *B29C 2947/92647* (2013.01); *B29C 2947/92704* (2013.01)

(58) Field of Classification Search
 CPC ........... B29C 2947/92152; B29C 2947/92209; B29C 2947/92647
 See application file for complete search history.

(56) References Cited

U.S. PATENT DOCUMENTS

| | | | |
|---|---|---|---|
| 6,753,405 | B2 | 6/2004 | Kratschmer et al. |
| 2008/0015289 | A1 | 1/2008 | Siripurapu |
| 2009/0239167 | A1* | 9/2009 | Adachi ............... G03G 5/0564 430/66 |
| 2011/0201762 | A1 | 8/2011 | Kato et al. |
| 2015/0094444 | A1 | 4/2015 | Chi et al. |

FOREIGN PATENT DOCUMENTS

| | | |
|---|---|---|
| CN | 103946267 A | 7/2014 |
| JP | 05-339390 A | 12/1993 |
| JP | 06-248066 A | 9/1994 |
| JP | 07-199488 A | 8/1995 |
| JP | 2011-012211 A | 1/2011 |
| KR | 10-2007-0071446 A | 7/2007 |
| KR | 2007-0071446 A | 7/2007 |
| KR | 10-2009-0017799 A | 2/2009 |
| KR | 10-2009-0026359 A | 3/2009 |
| KR | 2009-0026359 A | 3/2009 |
| KR | 10-2010-0022376 A | 3/2010 |
| KR | 2010-0022376 A | 3/2010 |
| WO | 2013/077490 A1 | 5/2013 |

OTHER PUBLICATIONS

English-translation of Office Action in counterpart Chinese Application No. 201310546206X dated Apr. 20, 2015, pp. 1-2.
International Search Report in commonly owned International Application No. PCT/KR2011/009958 dated Oct. 29, 2012, pp. 1-4.

* cited by examiner

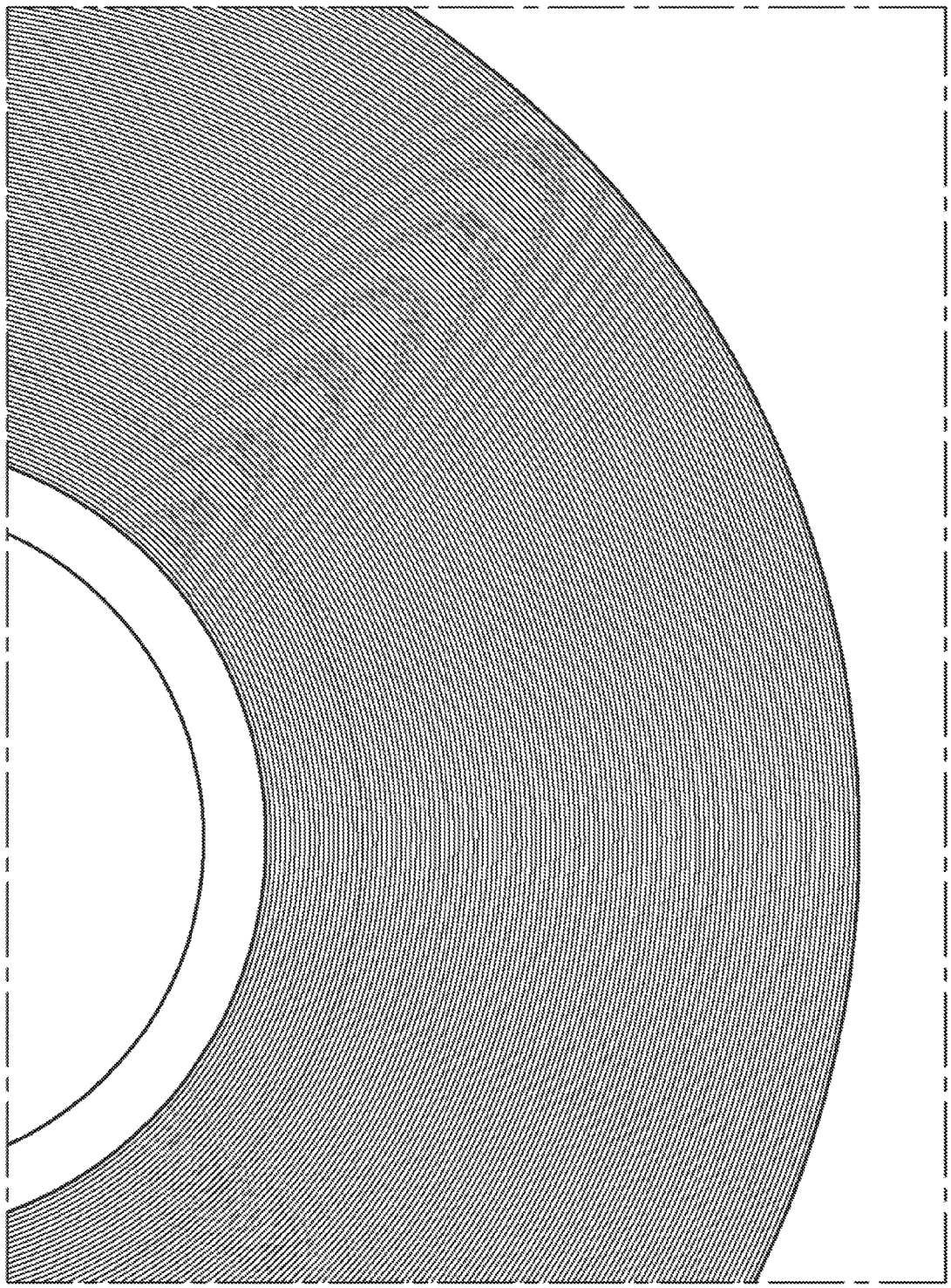

POLYCARBONATE RESIN FOR FILM, METHOD FOR PREPARING THE SAME AND FILM INCLUDING THE SAME

CROSS-REFERENCE TO RELATED APPLICATION

This application claims priority under 35 USC Section 119 to and the benefit of Korean Patent Application No. 10-2012-0155602, filed Dec. 27, 2012, the entire disclosure of which is incorporated herein by reference.

FIELD OF THE INVENTION

The present invention relates to a polycarbonate resin for films, a method for preparing the same, and a film including the same.

BACKGROUND OF THE INVENTION

Polycarbonate resins are representative thermoplastic materials having a thermal deformation temperature of about 135° C. or more. Polycarbonate resins can exhibit excellent mechanical properties, such as impact resistance, and excellent self extinguishability, dimensional stability, heat resistance and transparency. Polycarbonate resins thus have been widely used in the manufacture of exterior materials for electric and/or electronic products, office equipment, and automobile components, and as optical materials for optical disc substrates, various lenses, prisms, optical fibers, and the like.

However, polycarbonate resins exhibit low scratch resistance, which limits the use of polycarbonate resins as exterior materials. In order to supplement scratch resistance of polycarbonate resins, a separate scratch resistant film may be applied to a polycarbonate film. However, the scratch resistant film can be expensive and manufacturing costs can be increased due to an additional coating process.

Thus, research has been devoted to improving scratch resistance of polycarbonate resins. A widely used method for improving scratch resistance of polycarbonate resins is blending a polycarbonate resin with a resin having scratch resistance.

Although such a blending method can slightly improve scratch resistance, this method can provide an insignificant effect, and thus a fundamental measure for improving scratch resistance of polycarbonate resins is demanded.

Specifically, when a polycarbonate resin is blended with an acrylic resin to improve scratch resistance, there can be drastic deterioration in impact resistance. Also there can be significant increase in haze due to poor compatibility between the resins to be blended, which can significantly deteriorate transparency of the polycarbonate resin. Further, acrylic resins can be easily broken. Thus, when an acrylic resin is blended with a polycarbonate resin, films prepared from the blended resins can have low elongation, and are not suited to a roll form. Typically, films for industrial use must be prepared in roll form for the purpose of loading, transportation, and the like. However, such low elongation of the films results in undesirable moldability, thereby restricting the use of the films in industrial applications.

In addition, when plastic materials are used for films, the films are often painted for the purpose of decoration. In this case, paints may be diluted with various organic solvents, applied to a surface of the film, and then dried. During this process, the organic solvents used as diluents can penetrate into polycarbonate, causing deterioration in transparency and mechanical strength of the film. Thus, in order to form a polycarbonate resin film by painting and the like, there is a need for improvement in chemical resistance of a polycarbonate resin.

Korean Patent Publication Nos. 2007-0071446A, 2009-0026359A and 2010-0022376A disclose a method for improving chemical resistance of a polycarbonate resin by blending the polycarbonate resin with other resins having chemical resistance. Although such a method may slightly improve chemical resistance, this method provides an insignificant effect and can cause deterioration in impact resistance. Further, in order to enhance impact resistance deteriorated by blending, an impact reinforcing agent may be employed. In this case, however, significant decrease in transparency of the resin can be encountered.

Japanese Patent Publication No. H5-339390A and U.S. Pat. No. 5,401,826 disclose a method for improving chemical resistance by manufacturing a copolymerized polycarbonate in which a material having chemical resistance is incorporated into an existing polycarbonate resin. As one example of the chemically resistant material to be copolymerized, 4,4'-biphenol is copolymerized in the preparation of polycarbonate resins, thereby improving chemical resistance. However, although the polycarbonate resin may have improved chemical resistance by the use of 4,4'-biphenol, impact resistance of the resin may be lowered, thereby deteriorating the merits of the polycarbonate resin. As the amount of 4,4'-biphenol increases, flowability of the resin is drastically decreased, thereby deteriorating moldability.

Therefore, in order for polycarbonate resins to be used in the preparation of films, there is a need for a polycarbonate resin having excellent scratch resistance, elongation and chemical resistance without deterioration in inherent physical properties of the polycarbonate resin, such as impact resistance, transparency, and the like.

SUMMARY OF THE INVENTION

The present invention provides a polycarbonate resin for films, which can have excellent scratch resistance, elongation, chemical resistance and/or heat resistance and is capable of being used to prepare a film in roll form without a protective film, a method for preparing the same, and a film including the same and capable of being molded in various thicknesses.

The polycarbonate resin for films includes a repeat unit represented by Formula 1; a repeat unit represented by Formula 2; and a repeat unit represented by Formula 3, wherein the polycarbonate resin has a weight average molecular weight of about 15,000 g/mol to about 60,000 g/mol and a melt index of about 3 g/10 min to about 40 g/10 min.

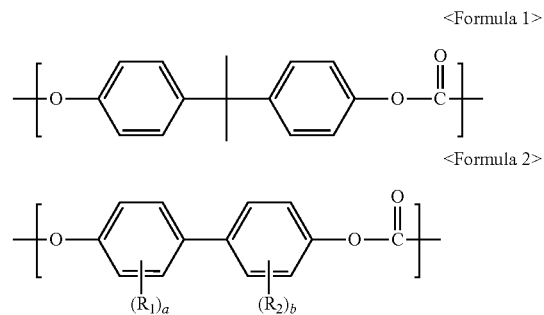

wherein $R_1$ and $R_2$ are the same or different and are each independently substituted or unsubstituted $C_1$ to $C_6$ alkyl, and a and b are the same or different and are each independently an integer ranging from 0 to 4.

<Formula 3>

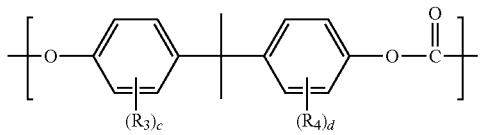

wherein $R_3$ and $R_4$ are the same or different and are each independently substituted or unsubstituted $C_1$ to $C_6$ alkyl, and c and d are the same or different and are each independently an integer ranging from 1 to 4.

In one embodiment, the polycarbonate resin for films may include about 10 mol % to about 85 mol % of the repeat unit represented by Formula 1, about 5 mol % to about 30 mol % of the repeat unit represented by Formula 2, and about 10 mol % to about 80 mol % of the repeat unit represented by Formula 3.

In one embodiment, the polycarbonate resin for films may have a pencil hardness of F or higher as measured under a load of 500 g in accordance with ASTM D3362, and a scratch width of less than about 310 μm as measured by Ball-type Scratch Profile (BSP) testing.

In one embodiment, the polycarbonate resin for films may have an elongation of about 30% to about 100% as measured at 25° C. in accordance with ASTM D638.

In one embodiment, the polycarbonate resin for films may have a transmittance of visible light of about 70% or more and a haze of about 5% or less as measured by immersing and drying a 3.2 mm thick flat panel specimen in diluents for priming of polycarbonate resins for 2 minutes.

The present invention also relates to a method for preparing a polycarbonate resin for films. The method includes: reacting a diol mixture of bisphenol A represented by Formula 4, a biphenol compound represented by Formula 5, and a bisphenol A compound represented by Formula 6 with a carbonate precursor.

<Formula 4>

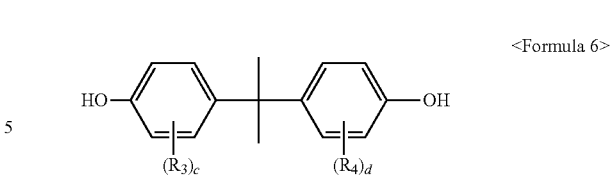

<Formula 5>

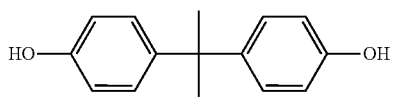

wherein $R_1$ and $R_2$ are the same or different and are each independently substituted or unsubstituted $C_1$ to $C_6$ alkyl, and a and b are the same or different and are each independently an integer ranging from 0 to 4.

<Formula 6>

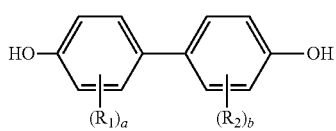

wherein $R_3$ and $R_4$ are the same or different and are each independently substituted or unsubstituted $C_1$ to $C_6$ alkyl, and c and d are the same or different and are each independently an integer ranging from 1 to 4.

In one embodiment, the bisphenol A represented by Formula 4 may be present in an amount of about 10 mol % to about 85 mol % in the diol mixture; the biphenol compound represented by Formula 5 may be present in an amount of about 5 mol % to about 30 mol % in the diol mixture; and the bisphenol A compound represented by Formula 6 may be present in an amount of about 10 mol % to about 80 mol % in the diol mixture.

The present invention also relates to a film. The film includes the polycarbonate resin for films and can have a thickness from about 30 μm to about 2,000 μm.

In one embodiment, the film may have a thickness from about 30 μm to about 200 μm.

In one embodiment, the film may have a pencil hardness of F or higher as measured under a load of 500 g in accordance with ASTM D3362, and a scratch width of less than about 310 μm as measured by Ball-type Scratch Profile (BSP) testing.

In one embodiment, the film may exhibit minimal or no cracking on an outer appearance thereof when the film is wound into a roll having a diameter of about 10 mm.

BRIEF DESCRIPTION OF THE DRAWING

FIG. 1 is a photograph of a film in roll form prepared in accordance with one embodiment of the present invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The polycarbonate resin for films according to the present invention includes, as a main chain, a repeat unit represented by Formula 1; a repeat unit represented by Formula 2; and a repeat unit represented by Formula 3, wherein the polycarbonate resin has a weight average molecular weight of about 15,000 g/mol to about 60,000 g/mol and a melt index of about 3 g/10 min to about 40 g/10 min.

<Formula 1>

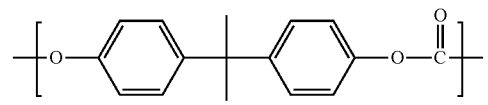

<Formula 2>

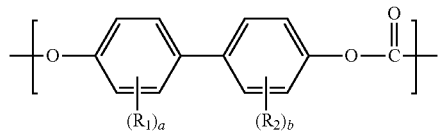

wherein $R_1$ and $R_2$ are the same or different and are each independently substituted or unsubstituted $C_1$ to $C_6$ alkyl, and a and b are the same or different and are each independently an integer ranging from 0 to 4.

<Formula 3>

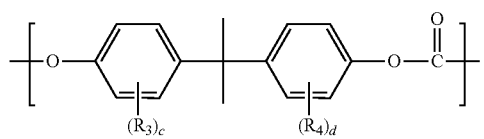

wherein $R_3$ and $R_4$ are the same or different and are each independently substituted or unsubstituted $C_1$ to $C_6$ alkyl, and c and d are the same or different and are each independently an integer ranging from 1 to 4.

The polycarbonate resin for films according to the present invention can have a weight average molecular weight (Mw) from about 15,000 g/mol to about 60,000 g/mol, for example from about 25,000 g/mol to about 50,000 g/mol, as measured by gel permeation chromatography (GPC). When the polycarbonate resin for films has a weight average molecular weight of less than about 15,000 g/mol, the resin can exhibit decreased mechanical properties and chemical resistance, which in turn can results in undesirable strength to the film upon molding. In addition, the film can have deteriorated resistance to alcohol solvents and the like. Further, when the polycarbonate resin for films has a weight average molecular weight of greater than about 60,000 g/mol, the resin can exhibit decreased flowability, and film moldability can be significantly decreased.

Further, the polycarbonate resin for films can have a melt index (MI) from about 3 g/10 min to about 40 g/10 min, for example from about 6 g/10 min to about 30 g/10 min, as measured at 300° C. under a load of 1.2 kg in accordance with ISO 1133. When the polycarbonate resin for films has a melt index of less than about 3 g/10 min, the resin can exhibit low flowability, and film moldability can be significantly deteriorated. When the polycarbonate resin for films has a melt index of greater than about 40 g/10 min, the resin can exhibit deteriorated mechanical properties and chemical resistance, which in turn can result in undesirable strength to the film upon molding. In addition, the film can have deteriorated resistance to alcohol solvents and the like.

The polycarbonate resin can include the repeat unit represented by Formula 1 in an amount of about 10 mol % to about 85 mol %, for example about 20 mol % to about 70 mol %, and as another example about 30 mol % to about 60 mol %, based on the total mol % (100 mol %) of the polycarbonate resin for films. In some embodiments, the polycarbonate resin can include the repeat unit represented by Formula 1 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 mol %. Further, according to some embodiments of the present invention, the amount of the repeat unit represented by Formula 1 can be in a range from about any of the foregoing amounts to about any other of the foregoing amounts.

Within this range, the resin can exhibit excellent mechanical properties such as Izod impact strength and the like.

The polycarbonate resin can include the repeat unit represented by Formula 2 in an amount of about 5 mol % to about 30 mol %, for example about 7 mol % to about 28 mol %, and as another example about 10 mol % to about 25 mol %, based on the total mol % (100 mol %) of the polycarbonate resin for films. In some embodiments, the polycarbonate resin can include the repeat unit represented by Formula 2 in an amount of about 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments of the present invention, the amount of the repeat unit represented by Formula 2 can be in a range from about any of the foregoing amounts to about any other of the foregoing amounts.

Within this range, the resin can exhibit excellent resistance to solvents (chemical resistance).

The polycarbonate resin can include the repeat unit represented by Formula 3 in an amount of about 10 mol % to about 80 mol %, for example about 20 mol % to about 73 mol %, and as another example about 30 mol % to about 70 mol %, based on the total mol % (100 mol %) of the polycarbonate resin for films. In some embodiments, the polycarbonate resin can include the repeat unit represented by Formula 3 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the repeat unit represented by Formula 3 can be in a range from about any of the foregoing amounts to about any other of the foregoing amounts.

Within this range, the resin can exhibit excellent scratch resistance and elongation.

In one embodiment, the polycarbonate resin for films includes the repeat unit represented by Formula 1 and the repeat unit represented by Formula 3 in a molar ratio (Formula 1:Formula 3) of about 20 to about 80:about 20 to about 80, for example about 30 to about 70:about 30 to about 70. Within this range, the resin can have excellent impact strength at room temperature and scratch resistance.

In another embodiment, the repeat unit (M1) represented by Formula 1, the repeat unit (M2) represented by Formula 2 and the repeat unit (M3) represented by Formula 3 in the polycarbonate resin for films may satisfy the following molar ratio conditions:

M2≤M1
M2≤M3

Within this range, the resin can exhibit excellent scratch resistance, chemical resistance and impact strength at room temperature.

The polycarbonate resin for films can have a pencil hardness of F or higher under a load of 500 g, for example H to 3H in accordance with ASTM D3362, and a scratch width of less than about 310 μm, for example about 100 μm to about 280 μm as measured by Ball-type Scratch Profile (BSP) testing. Within this range, the film prepared from the polycarbonate resin may not require a separate protective film.

The polycarbonate resin for films can have an elongation of about 30% to about 100%, for example about 50% to about 80% as measured at 25° C. on a 3.2 mm thick specimen in accordance with ASTM D638. Within this range, the film prepared from the polycarbonate resin for films can have excellent film moldability, and thus the film can be prepared in roll form.

In addition, the polycarbonate resin for films can have a transmittance of visible light (transmittance after immersion in a coating solution, unit: %) of about 70% or more, for example about 75% to about 98%, and a haze of about 5% or less, and as another example about 0.01% to about 4% as measured using a hazemeter by immersing and drying a 3.2 mm thick flat panel specimen in diluents for priming of polycarbonate resins for 2 minutes. Within this range, the resin can exhibit excellent chemical resistance.

The polycarbonate resin according to the present invention may be prepared by reacting a diol mixture of bisphenol A represented by Formula 4, a biphenol compound represented by Formula 5, and a bisphenol A compound represented by Formula 6 with a carbonate precursor.

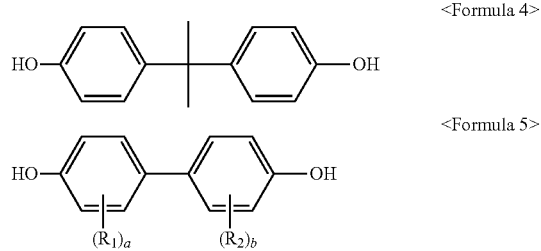

<Formula 4>

<Formula 5> wherein $R_1$ and $R_2$ are the same or different and are each independently substituted or unsubstituted $C_1$ to $C_6$ alkyl, and a and b are the same or different and are each independently an integer ranging from 0 to 4.

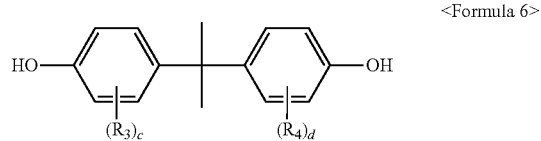

<Formula 6> wherein $R_3$ and $R_4$ are the same or different and are each independently substituted or unsubstituted $C_1$ to $C_6$ alkyl, and c and d are the same or different and are each independently an integer ranging from 1 to 4.

In one embodiment, the bisphenol A represented by Formula 4 is 2,2-bis-(4-hydroxyphenyl)-propane. In the diol mixture, the bisphenol A can be present in an amount of about 10 mol % to about 85 mol %, for example about 20 mol % to about 70 mol %, and as another example about 30 mol % to about 60 mol %. Within this range, the resin can exhibit excellent physical properties, such as Izod impact strength and the like.

Examples of the biphenol compound represented by Formula 5 may include without limitation 4,4'-biphenol, 2,2'-dimethyl 4,4'-biphenyldiol, 3,3-dimethyl 4,4-dihydroxy biphenyl, 2,2',6,6'-tetramethyl-4,4'-biphenol, and the like, and combinations thereof. In exemplary embodiments, 4,4'-biphenol can be used. The biphenol compound can be present in an amount of about 5 mol % to about 30 mol %, for example about 7 mol % to about 28 mol %, and as another example about 10 mol % to about 25 mol % in the diol mixture. Within this range, the resin can exhibit excellent resistance to solvents (chemical resistance).

Examples of the bisphenol A compound represented by Formula 6 may include without limitation 2,2-bis-(3,5-dimethyl-4-hydroxyphenyl)-propane, 2,2-bis-(3,5-diethyl-4-hydroxyphenyl)-propane, 2-bis-(3,5-diisopropyl-4-hydroxyphenyl)-propane, 2,2-bis-(3,5-dibutyl-4-hydroxyphenyl)-propane, and the like, and combinations thereof. In exemplary embodiments, 2,2-bis-(3,5-dimethyl-4-hydroxyphenyl)-propane can be used. The bisphenol A compound can be present in an amount of about 10 to about 80 mol %, for example about 20 to about 80 mol %, and as another example about 30 to about 70 mol % in the diol mixture. Within this range, the resin can exhibit excellent scratch resistance and elongation.

In one embodiment, the polycarbonate resin for films includes the bisphenol A represented by Formula 4 and the bisphenol A represented by Formula 6 in a molar ratio (Formula 4:Formula 6) of about 20 to about 80:about 20 to about 80, for example about 30 to about 70:about 30 to about 70. Within this range, the resin can have excellent impact strength at room temperature and scratch resistance.

In another embodiment, the bisphenol (M1) represented by Formula 4, the biphenol compound (M2) represented by Formula 5 and the bisphenol A compound (M3) represented by Formula 6 in the diol mixture may satisfy the following molar ratio conditions:

M2≤M1
M2≤M3

Within this range, the resin can exhibit excellent scratch resistance, chemical resistance and impact strength at room temperature.

Examples of the carbonate precursor may include without limitation phosgene, triphosgene, diaryl carbonate, mixtures thereof, and the like. Further, examples of the diaryl carbonate may include without limitation diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, and the like. These may be used alone or in combination of two or more thereof. In exemplary embodiments, diphenyl carbonate can be used.

The molar ratio of the diol mixture to the carbonate precursor (diol mixture/carbonate precursor) can be, for example, about 0.6 to about 1.0, for example about 0.7 to about 0.9. Within this range, the resin can exhibit excellent mechanical strength.

In one embodiment, reaction (polymerization) of the diol mixture and the carbonate precursor can be transesterification by melt polymerization, interfacial polymerization, solution polymerization, and the like. In exemplary embodiments, the reaction is performed by melt polymerization. The polymerization can be performed at a temperature of about 150° C. to about 330° C., for example about 170° C. to about 310° C., and as another example about 200° C. to about 290° C. under reduced pressure. Within this temperature range, the reaction can be advantageous with regard to reaction rate and decreased side reactions.

Further, transesterification can be performed under a reduced pressure of about 100 torr or less, for example, about 75 torr or less, for example about 30 torr or less, as another example about 1 torr or less for about 10 minutes or more, as another example about 15 minutes to about 24 hours, and as another example about 15 minutes to about 12 hours, which can be advantageous with regard to reaction rate and decreased side reactions.

The transesterification may be performed in the presence of a catalyst. As the catalyst, any catalyst typically used in transesterification may be employed. Examples of the catalyst may include without limitation alkali metal catalysts, alkaline earth catalysts, and the like. Examples of the alkali metal catalyst may include without limitation LiOH, NaOH, KOH, and the like. These may be used alone or in combination of two or more thereof. The catalyst can be used, for example, in an amount of about $1 \times 10^{-8}$ mole to about $1 \times 10^{-3}$ mole, for example about $1 \times 10^{-7}$ mole to about $1 \times 10^{-4}$ mole per mole of the diol mixture. Within this range, the resin can exhibit sufficient reactivity and the production of side products due to side reaction can be minimized, which can help improve thermal stability and color stability.

In some embodiments, the polycarbonate resin for films may further include a sulfonic acid ester compound represented by Formula 7. A sulfonic acid ester compound represented by Formula 7 may be added to the polymerized material prepared by the above method to prevent residual activity of the catalyst.

<Formula 7>

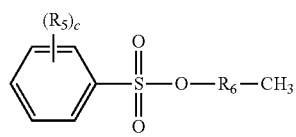

wherein each $R_5$ is independently substituted or unsubstituted $C_1$ to $C_{20}$ alkyl, $R_6$ is substituted or unsubstituted $C_{11}$ to $C_{20}$ alkylene, and c is an integer ranging from 0 to 5.

Examples of the sulfonic acid ester compound represented by Formula 7 may include without limitation dodecyl p-toluene sulfonic acid ester, octadecyl p-toluene sulfonic acid ester, dodecyl(dodecylbenzene) sulfonic acid ester, octadecyl(dodecylbenzene) sulfonic acid ester, and the like, and combinations thereof.

The sulfonic acid ester compound may be introduced in an amount of about 0.0001 parts by weight to about 0.001 parts by weight, for example about 0.0003 parts by weight to about 0.0008 parts by weight, based on about 100 parts by weight of the polycarbonate resin for films (or, monomer mixture and carbonate precursor). Within this range, the resin can have excellent thermal stability and hydrolysis resistance.

As methods for incorporating the sulfonic acid ester compound into a polycarbonate resin, in one embodiment, the method may be performed by adding the sulfonic acid ester compound to a reactor containing the prepared polycarbonate resin, followed by in-situ reaction. In another embodiment, the polycarbonate resin produced via transesterification and the sulfonic acid ester compound may be mixed in an extrusion stage. After reaction, the resultant polycarbonate is transferred to an extruder, to which the sulfonic acid ester compound is added, followed by extruding the mixture to form a film in pellet form.

Further, when the sulfonic acid ester compound is added to the polycarbonate resin of the invention, the polycarbonate resin may also be extruded by adding one or more conventional or typical additives, as needed. Examples of the additives may include without limitation flame retardants such as tris(2,4-di-tert-butylphenyl)phosphate, antioxidants such as octadecyl 3-(3,5-di-tertbutyl-4-hydroxyphenyl)propionate, antimicrobial agents, release agents, heat stabilizers, light stabilizers, compatibilizers, dyes, inorganic additives, fillers, plasticizers, impact reinforcing agents, admixtures, lubricants, antistatic agents, pigments, weather resistant agents, UV screens, and the like. These may be used alone or in combination of two or more thereof.

The film according to the present invention may include the polycarbonate resin for films. The film can have a thickness from about 30 μm to about 2,000 μm, for example about 50 μm to about 1,000 μm. When the thickness of the film is less than about 30 μm, the film can have deteriorated elongation and film moldability, and thus, the film can be broken upon molding of the film in roll form. When the thickness of the film exceeds about 2,000 μm, the film has no special merits. The film of the present invention can exhibit excellent film moldability even in a thickness range of about 30 μm to about 200 μm. When the film has a thickness of about 200 μm or less, the film prepared from a typical or conventional polycarbonate resin can suffer significant deterioration in moldability, such as breakage of the film, upon molding of the film in roll form.

As the method for preparing the film, any typical methods may be employed. For example, the film may be prepared from the polycarbonate resin in pellet form, chip form or the like by extrusion molding, injection molding, vacuum molding, cast molding, blow molding, calendar molding, and the like. These methods are well known to those skilled in the art to which the present invention pertains.

The film may have a pencil hardness of F or higher, for example H to 3H as measured under a load of 500 g in accordance with ASTM D3362, and a scratch width of less than about 310 μm, for example about 100 μm to about 280 μm as measured by Ball-type Scratch Profile (BSP) test. Within this range, the film can exhibit excellent scratch resistance, and thus can be used per se without a separate protective film.

Further, the film can have a transmittance of visible light (transmittance after immersion in a coating solution, unit: %) of about 70% or more, for example about 80% to about 98% as measured by immersing a 3.2 mm thick flat panel specimen in diluents for priming of polycarbonate resins, drying the film at 80° C. for 30 minutes and then measuring the transmittance of the film using a Hazemeter. The film can have a haze of about 5% or less, for example about 0.01% to about 4%. Within this range, the film can have excellent chemical resistance.

The film according to the present invention may be used in various fields, and can have excellent scratch resistance, chemical resistance, transparency, impact resistance, and the like. Since the film of the present invention may be prepared in roll form, the film can have excellent moldability. Accordingly, the film may be used as a polycarbonate for packaging materials, films for printing, optical films, window sheets, and the like. For example, the film can be very useful as a rollable optical film. For example, FIG. 1 illustrates a photograph of the film prepared in a roll form in accordance with one embodiment of the invention.

Next, the present invention will be explained in more detail with reference to some examples. It should be understood that these examples are provided for illustration only and are not to be in any way construed as limiting the present invention.

EXAMPLES

Examples 1 to 5 and Comparative Example 1

To a reactor, a diol mixture of 2,2-bis(4-hydroxyphenyl)propane (BPA), 4,4'-biphenol (BP), and 3,3'-dimethyl bisphenol A (DMBPA) in amounts as listed in Table 1, based on 100 parts by mole of the diol mixture, 102.8 parts by mole of diphenyl carbonate, and 150 ppb of KOH (based on 1 mole of bisphenol A) are sequentially added, and oxygen in the reactor is purged with nitrogen. The temperature of the reactor is heated to 160° C., heated to 190° C. and reacted for 6 hours. After 6 hours, the temperature of the reactor is heated to 210° C. and maintained at a pressure of 100 torr for 1 hour. Subsequently, the temperature of the reactor is heated to 260° C. and maintained at a pressure of 20 torr for 1 hour, followed by lowering the pressure to 0.5 torr and maintained for 1 hour, thereby preparing a polycarbonate resin in a molten state.

Then, to 100 parts by weight of the polycarbonate resin composition in a molten state, 0.03 parts by weight of octadecyl 3-(3,5-di-tertbutyl-4-hydroxyphenyl)propionate as an antioxidant, and 0.05 parts by weight of tris(2,4-di-tert-butylphenyl)phosphate as a phosphorus heat stabilizer are added, kneaded and extruded using a twin-screw extruder having a diameter of 45 mm and L/D=40, thereby preparing a polycarbonate resin in pellet form.

The weight average molecular weight (Mw) of the prepared polycarbonate resin is measured by gel permeation chromatography (GPC). Melt index (MI) of the prepared polycarbonate resin is measured at 300° C. under a load of 1.2 kg in accordance with ISO 1133. Results are shown in Table 1.

Comparative Example 2

90 parts by weight of the polycarbonate (PC) resin prepared in Comparative Example 1, 10 parts by weight of polymethyl methacrylate (PMMA) (weight average molecular weight: 92,000 g/mol, manufacturer: LG MMA, Model No. L84), 0.03 parts by weight of octadecyl 3-(3,5-di-tertbutyl-4-hydroxyphenyl)propionate as an antioxidant, and 0.05 parts by weight of tris(2,4-di-tert-butylphenyl)phosphate as a phosphorus heat stabilizer are added, kneaded and extruded using a twin-screw extruder having a diameter of 45 mm and L/D=40, thereby preparing a polycarbonate resin composition in pellet form. The weight average molecular weight (Mw) of the polycarbonate resin composition is measured by gel permeation chromatography (GPC). Melt index (MI) of the prepared polycarbonate resin composition is measured at 300° C. under a load of 1.2 kg in accordance with ISO 1133. Results are shown in Table 1.

Comparative Example 3

A polycarbonate resin composition in pellet form is prepared in the same manner as in Comparative Example 2 except that 70 parts by weight of the polycarbonate (PC) resin and 30 parts by weight of polymethyl methacrylate (PMMA) are used. The weight average molecular weight (Mw) of the polycarbonate resin composition is measured by gel permeation chromatography (GPC). Melt index (MI) of the prepared polycarbonate resin composition is measured at 300° C. under a load of 1.2 kg in accordance with ISO 1133. Results are shown in Table 1.

Comparative Example 4

A polycarbonate resin composition in pellet form is prepared in the same manner as in Comparative Example 2 except that 50 parts by weight of the polycarbonate (PC) resin and 50 parts by weight of polymethyl methacrylate (PMMA) are used. The weight average molecular weight (Mw) of the polycarbonate resin composition is measured by gel permeation chromatography (GPC). Melt index (MI) of the prepared polycarbonate resin composition is measured at 300° C. under a load of 1.2 kg in accordance with ISO 1133. Results are shown in Table 1.

Comparative Examples 5 and 6

Polycarbonate resins in a molten state are prepared in the same manner as in Example 3, wherein Comparative Example 5 is performed by lowering the pressure to 0.5 torr and maintaining for 7 minutes to prepare a polycarbonate resin in a molten state, and wherein Comparative Example 6 is performed by lowering the pressure to 0.5 torr and maintaining for 30 hours to prepare a polycarbonate resin in a molten state. The weight average molecular weight (Mw) of the prepared polycarbonate resin is measured by gel permeation chromatography (GPC). Melt index (MI) of the prepared polycarbonate resin is measured at 300° C. under a load of 1.2 kg in accordance with ISO 1133. Results are shown in Table 1.

TABLE 1

|  |  | Example | | | | | Comparative Example |
|---|---|---|---|---|---|---|---|
|  |  | 1 | 2 | 3 | 4 | 5 | 1 |
| PC composition (mol %) | BPA | 85 | 60 | 40 | 30 | 10 | 100 |
|  | BP | 5 | 10 | 10 | 20 | 10 | — |
|  | DMBPA | 10 | 30 | 50 | 50 | 80 | — |
|  | DPC | 100 | 100 | 100 | 100 | 100 | 100 |
| Resin composition (parts by weight) | PC | 100 | 100 | 100 | 100 | 100 | 100 |
|  | PMMA | — | — | — | — | — | — |
| PC Mw (g/mol) |  | 38,500 | 40,200 | 45,700 | 45,200 | 48,300 | 28,500 |
| MI (g/10 min) |  | 6.1 | 8.5 | 11.5 | 13.5 | 8.0 | 7.1 |

|  |  | Comparative Example | | | | |
|---|---|---|---|---|---|---|
|  |  | 2 | 3 | 4 | 5 | 6 |
| PC composition (mol %) | BPA | 100 | 100 | 100 | 40 | 40 |
|  | BP | — | — | — | 10 | 10 |
|  | DMBPA | — | — | — | 50 | 50 |
|  | DPC | 100 | 100 | 100 | 100 | 100 |

TABLE 1-continued

| Resin composition (parts by weight) | PC | 90 | 70 | 50 | — | — |
|---|---|---|---|---|---|---|
| | PMMA | 10 | 30 | 50 | — | — |
| PC Mw (g/mol) | | 28,500 | 28,500 | 28,500 | 14,300 | 62,100 |
| MI (g/10 min) | | 8.5 | 9.1 | 11.7 | 55.7 | 2.4 |

Examples 6 to 11 and Comparative Examples 7 to 12

The polycarbonate resins in pellet form and the polycarbonate resin compositions prepared in Examples 1 to 5 and Comparative Examples 1 to 6 are sufficiently dried (Resins of Examples 1 to 5 and Comparative Examples 1, 5 to 6: dried at 110° C. for 4 hours; Resin compositions of Comparative Examples 2 to 4: dried at 90° C. for 4 hours), introduced into a single screw extruder having a diameter of 65 mm and L/D=36, followed by melting the pellets by adjusting the temperature of a cylinder to 260° C., thereby discharging an extruded melt through a T-die. The thickness of the prepared film is adjusted by controlling the space of the T-die (Examples 6 to 10 and Comparative Examples 7 to 12: 130 μm, Example 11: 1,000 μm). In Examples 6 to 10, the resins prepared in Examples 1 to 5 are used, respectively; in Comparative Examples 7 to 12, the resins and resin compositions prepared in Comparative Examples 1 to 6 are used, respectively; and in Example 11, the resin prepared in Example 3 is used. The melted polycarbonate resin in film form discharged through T-die is cooled and solidified using a cooling roll to prepare a film. Physical properties of the prepared films are measured by the following methods. Results are shown in Table 2.

Methods for Measuring Physical Properties (1) Haze (unit: %): Haze is measured on a film specimen having a size of W30 mm x L30 mm×t130 (300, 1,000) μm using Haze meter NDH 2000 (Nippon Denshoku Co. Ltd.). Haze vale (%) is calculated by Equation: (diffuse light transmittance (DF)/total light transmittance (TT))×100.

(2) Glass transition temperature (Tg, unit: ° C.): Glass transition temperature is measured by heating a film specimen from 25° C. to 200° C. at a heating rate of 10° C./min using a differential scanning calorimeter (DSC).

(3) Pencil hardness: Pencil hardness is measured under a load of 500 g in accordance with ASTM D3362. Higher hardness indicates higher scratch resistance. Higher blackness indicates lower scratch resistance.

(4) Elongation (unit: %): Elongation is measured on a 3.2 mm thick specimen in accordance with ASTM D638.

(5) Film moldability: Film moldability is evaluated with the naked eye by observing whether the appearance of the film is maintained without deformation when the prepared film is wound into a roll having a diameter of 10 mm. (Good: No cracking; Crack: occurrence of cracking).

(6) Chemical resistance (alcohols): A tensile test specimen is prepared through injection molding in accordance with ASTM D638, to which methanol and isopropyl alcohol are added dropwise under 2.1% strain in accordance with ASTM D543 which is a standard for Environmental Stress Crack Resistance. After 10 minutes, chemical resistance is measured by observing cracks on a curved surface of the specimen (⊚: No cracking, o: fine cracking, Δ: severe cracking, X: haze observed due to cracks).

(7) Chemical resistance (Transmittance after immersion in a coating solution; unit: %): A 3.2 mm thick tensile test specimen is immersed in diluents (thinner, major components: methylisobutylketone, cyclohexanone, 2-ethoxyethanol) for priming of polycarbonate resins, dried at 80° C. for 30 minutes, followed by measurement of visible light transmittance (%) using a haze meter (manufacturer: BYK-Gardner, Model: GmbH 4725). Typically, chemical resistant transmittance is preferably 70% or more, and haze is preferably 5% or less.

(8) Scratch resistance (unit: μm): Scratch resistance is measured by Ball-type Scratch Profile (BSP) testing. The BSP testing is conducted by applying a 10 to 20 mm long scratch to a surface of a resin specimen under a load of 1,000 g at a speed of 75 mm/min using a circular metal tip having a diameter of 0.7 mm, and measuring a profile of the applied scratch using a metal stylus tip having a diameter of 2 μm through a surface profile analyzer (XP-1). Scratch resistance is evaluated based on scratch width (unit: μm) of the measured scratch profile. A lower scratch width indicates higher scratch resistance.

TABLE 2

| | Example | | | | | | Comparative Example | | | | | |
|---|---|---|---|---|---|---|---|---|---|---|---|---|
| | 6 | 7 | 8 | 9 | 10 | 11 | 7 | 8 | 9 | 10 | 11 | 12 |
| Resin used | 1 | 2 | 3 | 4 | 5 | 3 | 1 | 2 | 3 | 4 | 5 | 6 |
| Film thickness (μm) | 130 | 130 | 130 | 130 | 130 | 1000 | 130 | 130 | 130 | 130 | 130 | 300 |
| Haze (%) | 0.2 | 0.2 | 0.2 | 0.2 | 0.2 | 0.3 | 0.2 | 70 | 75 | 80 | 0.4 | 0.4 |
| Tg (° C.) | 139 | 137 | 133 | 135 | 127 | 133 | 147 | 130 | 115 | 98 | 130 | 135 |
| Pencil hardness | F | F | H | H | 2H | H | 2B | HB | F | H | H | H |
| Elongation (%) | 95 | 85 | 70 | 65 | 51 | 70 | 120 | 30 | 8 | 7 | 10 | 70 |
| Film moldability | Good | Good | Good | Good | Good | Good | Good | Crack | Crack | Crack | Good | Crack |
| Chemical resistance Alcohols | ◯ | ⊚ | ⊚ | ⊚ | ⊚ | ⊚ | X | X | Δ | Δ | Δ | ⊚ |
| Transmittance | 80 | 87 | >88 | >88 | >88 | >88 | <10 | <10 | <10 | <10 | 50 | >88 |
| Scratch width (μm) | 285 | 275 | 245 | 240 | 214 | 245 | 335 | 310 | 270 | 250 | 245 | 240 |

As can be seen from the results in Tables 1 and 2, the films of Examples 6 to 11, wherein a mixture of bisphenol A, a biphenol compound and a bisphenol A compound is used as a diol mixture and the copolymerized polycarbonate resin having a weight average molecular weight (Mw) of 15,000 to 60,000 g/mol and a melt index (MI) of 3 to 40 g/10 min is used, exhibit excellent heat resistance, chemical resistance without lowering transparency, excellent film moldability based on an elongation of 51% or more, and excellent scratch resistance based on a pencil hardness of F or higher and scratch width of 310 μm or less. Further, the films of Examples 6 to 11 could be used without any separate protective film and could be molded in roll form. In contrast, in Comparative Example 7 wherein a polycarbonate resin containing only bisphenol A is used, it could be seen that a typical polycarbonate resin has very poor scratch resistance and chemical resistance and thus cannot be used for films. In Comparative Examples 8 to 10, wherein a resin composition is obtained by blending a polycarbonate resin and a polymethylmethacrylate resin, it can be seen that the resin composition had a lower elongation, which also significantly deteriorated film moldability, and lower chemical resistance. Furthermore, in Comparative Examples 11 and 12 wherein polycarbonate resins having a weight average molecular weight and a melt index deviating from the scope of the invention are used, it could be seen that the films exhibit significant deterioration in physical properties in terms of elongation, chemical resistance and film moldability. Specifically, in Comparative Example 12, the film had a high molecular weight and exhibited lower flowability, thereby making it difficult to mold a film to a thickness of 130 μm. Thus, the film of Comparative Example 12 is formed to a thickness of 300 μm in measurement of the physical properties.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin for films, comprising:
   about 20 mol % to about 60 mol % of a repeat unit represented by Formula 1;
   about 10 mol % to about 30 mol % of a repeat unit represented by Formula 2; and
   about 30 mol % to about 70 mol % of a repeat unit represented by Formula 3,
   wherein the polycarbonate resin has a weight average molecular weight of about 15,000 g/mol to about 60,000 g/mol and a melt index of about 3 g/10 min to about 40 g/10 min, <Formula 1>

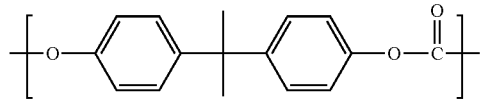

<Formula 2>

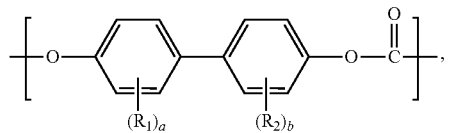

wherein $R_1$ and $R_2$ are the same or different and are each independently substituted or unsubstituted C1 to C6 alkyl, and a and b are the same or different and are each independently an integer ranging from 0 to 4, <Formula 3>

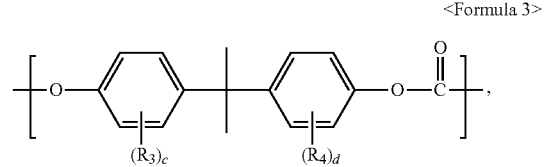

wherein $R_3$ and $R_4$ are the same or different and are each independently substituted or unsubstituted C1 to C6 alkyl, and c and d are the same or different and are each independently an integer ranging from 1 to 4.

2. The polycarbonate resin for films according to claim 1, wherein the polycarbonate resin has a pencil hardness of F or higher as measured under a load of 500 g in accordance with ASTM D3362, and a scratch width of less than about 310 μm as measured by a Ball-type Scratch Profile (BSP) test.

3. The polycarbonate resin for films according to claim 1, wherein the polycarbonate resin has an elongation of about 30% to about 100% as measured at 25° C. in accordance with ASTM D638.

4. The polycarbonate resin for films according to claim 1, wherein the polycarbonate resin has a transmittance of visible light of about 70% or more as measured by immersing and drying a 3.2 mm thick flat panel specimen in diluents for priming of polycarbonate resins for 2 minutes, and a haze of about 5% or less.

5. A film comprising the polycarbonate resin for films according to claim 1 and having a thickness from about 30 μm to about 2,000 μm.

6. The film according to claim 5, wherein the film has a thickness from about 30 μm to about 200 μm, an elongation of about 30% to about 100% as measured at 25° C. in accordance with ASTM D638, and a transmittance of visible light of about 70% or more as measured by immersing and drying a 3.2 mm thick flat panel specimen in diluents for priming of polycarbonate resins for 2 minutes.

7. The film according to claim 5, wherein the film has a thickness from about 30 μm to about 200 μm.

8. The film according to claim 5, wherein the film has a pencil hardness of F or higher as measured under a load of 500 g in accordance with ASTM D3362, and a scratch width of less than about 310 μm as measured by Ball-type Scratch Profile (BSP) test.

9. The film according to claim 5, wherein the film exhibits no cracking on an outer appearance thereof when the film is wound into a roll having a diameter of about 10 mm.

10. The polycarbonate resin for films according to claim 1, wherein the repeat unit represented by Formula 3 comprises 2,2-bis-(3,5-dimethyl-4-hydroxyphenyl)-propane, 2,2-bis-(3,5-diethyl-4-hydroxyphenyl)-propane, 2-bis-(3,5-diisopropyl-4-hydroxyphenyl)-propane, 2,2-bis-(3,5-dibutyl-4-hydroxyphenyl)-propane, and/or a combinations thereof.

11. The polycarbonate resin for films according to claim 1, wherein the repeat unit represented by Formula 3 comprises 2,2-bis-(3,5-dimethyl-4-hydroxyphenyl)-propane.

12. The polycarbonate resin for films according to claim 11, wherein a film made of the polycarbonate resin has a scratch width of 240 to 275 μm as measured by a Ball-type Scratch Profile (BSP) test and an elongation of 65% to 85% as measured at 25° C. in accordance with ASTM D638.

13. The polycarbonate resin for films according to claim 1, wherein the polycarbonate resin has a weight average molecular weight of about 25,000 g/mol to about 50,000 g/mol and a melt index of about 6 g/10 min to about 30 g/10 min.

14. The polycarbonate resin for films according to claim 13, wherein the polycarbonate resin has a weight average molecular weight of 38,500 g/mol to about 50,000 g/mol and a melt index of about 6 g/10 min to 13.5 g/10 min.

* * * * *